United States Patent
Ripley

(10) Patent No.: US 6,742,001 B2
(45) Date of Patent: May 25, 2004

(54) SYSTEM AND METHOD FOR SHARING DATA BETWEEN HIERARCHICAL DATABASES

(75) Inventor: John R. Ripley, Round Rock, TX (US)

(73) Assignee: Infoglide Corporation, Austin, TX (US)

( * ) Notice: Subject to any disclaimer, the term of this patent is extended or adjusted under 35 U.S.C. 154(b) by 234 days.

(21) Appl. No.: 09/681,926

(22) Filed: Jun. 27, 2001

(65) Prior Publication Data

US 2002/0023097 A1 Feb. 21, 2002

Related U.S. Application Data

(60) Provisional application No. 60/214,891, filed on Jun. 29, 2000.

(51) Int. Cl.[7] ............................................. G10G 17/30
(52) U.S. Cl. ................................................. 707/104.1
(58) Field of Search ........................... 707/104.1, 102, 707/103.4; 709/220; 712/209

(56) References Cited

U.S. PATENT DOCUMENTS

| | | | | | |
|---|---|---|---|---|---|
| 5,267,156 | A | * | 11/1993 | Nomiyama | 704/10 |
| 5,995,958 | A | * | 11/1999 | Xu | 707/3 |
| 6,363,388 | B1 | * | 3/2002 | Sprenger et al. | 707/10 |
| 6,453,315 | B1 | * | 9/2002 | Weissman et al. | 707/5 |
| 6,493,663 | B1 | * | 12/2002 | Ueda | 704/9 |

* cited by examiner

*Primary Examiner*—Safet Metjahic
*Assistant Examiner*—Sana Al-Hashemi
(74) *Attorney, Agent, or Firm*—Taylor Russell & Russell, PC

(57) ABSTRACT

The present invention is a computer-implemented system and method that allow data from a first hierarchical data structure to be applied to a second hierarchical data structure. The method comprises recursively comparing the source elements of the first hierarchical structure to the target elements of the second hierarchical structure, and applying the data from a source element or source child element to a matching target element or target child element. The method is iterated, until all elements of the second hierarchical data structure have been traversed.

22 Claims, 20 Drawing Sheets

201 — DATA_TYPE = DATA_TYPE_NAME + [PARENT_DATA_TYPE_REF] + [(ELEMENT)*]

202 — DATA_TYPE_NAME = a name that uniquely identifies this datatype from other datatypes 203 — PARENT_DATA_TYPE_REF = a reference to another datatype using it's DATA_TYPE_NAME. This value indicates that this datatype is a "descendent" of PARENT_DATA_TYPE_REF 204 — ELEMENT = ELEMENT_NAME + [DATA_TYPE_REF] + [POSITIONAL_REFERENCE] + [ALIAS_NAME] + [(ELEMENT)*]

205 — ELEMENT_NAME = a name that identifies this element

206 — DATA_TYPE_REF = a reference to another datatype using it's DATA_TYPE_NAME. This value indicates that child structure of this element is at least equal to the child structure of the datatype referenced.

207 — POSITIONAL_REFERENCE = ELEMENT_REF

208 — ELEMENT_REF = a reference to a child element of the datatype specified by DATA_TYPE_REF in this elements parent element.

209 — ALIAS_NAME = a reference to a child element of the datatype specified by DATA_TYPE_REF in this elements parent element. When specifying this value, it indicates that the element referred to by ALIAS_NAME is now replaced by ELEMENT_NAME

FIG. 2

```
<SimpleName/>

<CompoundName instanceOf="SimpleName">                    500
      <First/>
      <Middle/>
      <Last/>
</CompoundName>

<ComplexName instanceOf="CompoundName">
      <Prefix insert="First"/>
      <Suffix/>
</ComplexName>

<FormattedName instanceOf="CompoundName">
      <Given1 alias="First"/>
      <Given2 alias="Middle"/>
      <Surname alias="Last"/>
</FormattedName>

<BusinessName instanceOf="SimpleName"/>
```

FIG. 5A

```
<Person>
      <Name instanceOf="CompoundName">
            <First/>
            <Middle/>
            <Last/>                                       510
      </Name>
      <Address instanceOf="CompoundAddress">
            <Street/>
            <City/>
            <State/>
            <Zip/>
      </Address>
      <DateOfBith instanceOf="Date"/>
      <SSN/>
</Person>
```

FIG. 5B

Schema A

```
<CustomerInfo>
    <Name instanceOf="CompoundName">
        <First/>
        <Middle/>
        <Last/>
    </Name>
    <Address instanceOf="CompoundAddress>            600
    <Street/>
        <City/>
        <State/>
        <Zip/>
    </Address>
    <Race/>
    <Gender/>
    <DOB/>
    <Income/>
    <CreditInfo>
        <Type/>
        <Number/>
        <ExpirationDate/>
    </CreditInfo>
</CustomerInfo>
```

Schema B

```
<Invoice>
    <Purchaser>
        <Name instanceOf="ComplexName">
            <First/>
            <Middle/>
            <Last/>
        </Name>
        <Address instanceOf="CanadianAddress>
            <Street/>
            <City/>
            <Province/>
            <PostalCode/>
        </Address>
        <CreditCard instanceOf="CreditCard">
            <Type/>
            <Name/>
            <Number/>
            <ExpiryDate/>
        </CreditCard>
    </Purchaser>
    <Product>
        <SKU/>
        <Description/>
        <Price/>
    </Product>
</Invoice>
```

FIG. 6

```
801
    CONTEXT_MAP = SYMMETRIC_DESIGNATION + SOURCE + TARGET
802
    SYMMETRIC_DESIGNATION = indicates whether a TARGET => SOURCE mapping is
    also implied
803
    SOURCE = SCHEMA_CONTEXT
                                                                    800
804
    TARGET = SCHEMA_CONTEXT
805
    SCHEMA_CONTEXT = PARENT_ELEMENT_CONTEXT + DELIMITER + ELEMENT_NAME
806
    PARENT_ELEMENT_CONTEXT = SCHEMA_CONTEXT of the element's parent (if one
    exists)
807
    DELIMITER = some known character value that doesn't appear in the
    ELEMENT_NAMEs that make up this context
```

FIG. 8A

```
<Map symmetric="true">
      <Source>CustomerInfo</Source>
      <Target>Invoice/Purchaser</Target>
</Map>
                                                                    810
<Map symmetric="false">
      <Source>Incident/Suspect</Source>
      <Target>AuctionCompany/Auctions/Seller</Target>
</Map>
```

FIG. 8B

901 — COMPARISON_ALGORITHM = ALGORITHM_NAME + IMPLEMENTATION_REFERENCE [+ IMPLEMENTAION_PARAMETERS]

902 — ALGORITHM_NAME = a unique way to identify this algorithm from other algorithms.

903 — IMPLEMENTATION_REFERENCE = a means to identify an implementation of this algorithm. This may include, but is not limited to class name, function call names, and dynamically loadable libraries.

904 — IMPLEMENTAION_PARAMETERS = a set of parameters used to configure this specific instance of implementation

```
<STRING_DIFFERENCE class="com.company.comparisons.StringDiffScore"/>

<SOUNDEX class=" com.company.comparisons.SoundexScore"/>

<NAME_SYNONYM class="com.company.comparisons.SynonymScore">
        <SIMLAR degree="0.9">
            <ELEMENT>Robert</ELEMENT>
            <ELEMENT>Bob</ELEMENT>
            <ELEMENT>Rob</ELEMENT>
            <ELEMENT>Bobby</ELEMENT>
            <ELEMENT>Robby<ELEMENT>
        </SIMILAR>                                            910
        <SIMLAR degree="0.85">
            <ELEMENT>John</ELEMENT>
            <ELEMENT>Johnny</ELEMENT>
            <ELEMENT>Jon</ELEMENT>
            <ELEMENT>Juan</ELEMENT>
            <ELEMENT>Jack<ELEMENT>
        </SIMILAR>
</SYNONYM>
```

FIG. 9B

TABLE OF COMPARISON TYPES USED IN STRATEGIES OF TTE — 1000

| | Inputs Received | Success Indicators |
|---|---|---|
| Context Comparison | Source schema context. Target schema context. | Existence of mapping specification (including any symmetric versions) is found, using UDMS. |
| Element Comparison | Two element names. Name Comparison Algorithm. Normalized threshold score. | Calling the Name Comparison Algorithm with the two element names results in a normalized score equal to or greater than the threshold score. |
| Attribute Comparison | Two attribute values. Attribute Comparison Algorithm. Normalized threshold score. | Calling the Attribute Comparison Algorithm with the two attribute values results in a normalized score equal to or greater than the threshold score. |
| Datatype Lineage Comparison | Two Datatype Names. Reference to Lineage Comparison Algorithm that is registered with SSS. Normalized threshold score. | Calling the Lineage Comparison Algorithm with the two Datatype Names results in a normalized score equal to or greater than the threshold score. |
| Datatype Tree/Structure Comparison | Two hierarchical data structures. Reference to Tree Comparison Algorithm that is registered with SSS. Normalized threshold score. | Calling the Tree Comparison Algorithm with the two hierarchical data structures results in a normalized score equal to or greater than the threshold score. |

FIG. 10

```
1101  TTS = (STRATEGY)*

1102  STRATEGY = (COMPARISON_TYPE)*

1103  COMPARISON_TYPE = CONTEXT_COMPARE | ELEMENT_COMPARE | DATATYPE_COMPARE |
      ATTRIBUTE_COMPARE

1104  CONTEXT_COMPARE = determines if a map exists in the User-Defined Mapping Services
      for two SCHEMA_CONTEXTs (including a symmetric version).

1105  ELEMENT_COMPARE = NAME_COMPARISON_ALGORITHM + THRESHOLD

1106  ATTRIBUTE_COMPARE = ATTRIBUTE_NAME + NAME_COMPARISON_ALGORITHM + THRESHOLD

1107  NAME_COMPARISON_ALGORITHM = a comparison algorithm registered in the Similarity
      Scoring Services that compares two ELEMENTS_NAMES or two ATTRIBUTE_VALUES and
1108  returns a normalized score.

DATATYPE_COMPARE = LINEAGE_COMPARE | CHILD_STRUCTURE_COMPARE

1109  LINEAGE_COMPARE = LINEAGE_COMPARISON_ALGORITHM + THRESHOLD

1110  LINEAGE_COMPARISON_ALGORITHM = a comparison algorithm registered in the
      Similarity Scoring Services that compares datatypes and returns a normalized
1111  score that indicates proximity of the data types are in their family tree.

CHILD_STRUCTURE_COMPARE = TREE_COMPARISON_ALGORITHM + THRESHOLD

1112  TREE_COMPARISON_ALGORITHM = a comparison algorithm registered in the Similarity
      Scoring Services that compares two data hierarchies and returns a normalized
      score based on the similarity of their child structures.
1113
      THRESHOLD = a normalized score indicating similarity or proximity.
```

FIG. 11

```
<TTE>
  <STRATEGY>
    <MAP/>
  </STRATEGY>
  <STRATEGY>
    <ELEMENT compare="exact" threshold="1.0"/>
    <DATATYPE compare="lineage" threshold="1.0"/>
    <ATTRIBUTE value="description" compare="exact" threshold="1.0"/>
  </STRATEGY>
  <STRATEGY>
    <ELEMENT compare="exact" threshold="1.0"/>
    <DATATYPE compare="lineage" threshold="1.0"/>
    <ATTRIBUTE value="description" compare="string_diff" threshold="0.8"/>
  </STRATEGY>
  <STRATEGY>
    <ELEMENT compare="exact" threshold="1.0"/>
    <DATATYPE compare="lineage" threshold="1.0"/>
  </STRATEGY>
  <STRATEGY>
    <ELEMENT compare="exact" threshold="1.0"/>
    <DATATYPE compare="lineage" threshold="0.5"/>
    <ATTRIBUTE value="description" compare="exact" threshold="1.0"/>
  </STRATEGY>
  <STRATEGY>
    <ELEMENT compare="exact" threshold="1.0"/>
    <DATATYPE compare="lineage" threshold="0.5"/>
    <ATTRIBUTE value="description" compare="string_diff" threshold="0.8"/>
  </STRATEGY>
  <STRATEGY>
    <ELEMENT compare="exact" threshold="1.0"/>
    <DATATYPE compare="lineage" threshold="0.5"/>
  </STRATEGY>
  <STRATEGY>
    <ELEMENT compare="string_diff" threshold="1.0"/>
    <DATATYPE compare="structure" threshold="1.0"/>
    <ATTRIBUTE value="description" compare="string_diff" threshold="0.8"/>
  </STRATEGY>
</TTE>
```

FIG. 12

SYSTEM AND METHOD FOR SHARING DATA BETWEEN HIERARCHICAL DATABASES

CROSS REFERENCE TO RELATED APPLICATIONS

Referenced-applications

This application claims the benefit of U.S. Provisional Application 60/214,891, filed Jun. 29, 2000.

BACKGROUND OF INVENTION

The present invention relates generally to database management systems. More particularly, the invention is a computer-implemented method that allows data in different databases, which may have different formats and structures, to be shared without remodeling the data. The system and method provides for transforming one hierarchical data structure to another hierarchical data structure.

Information resources often comprise huge databases that must be searched in order to extract useful information. One example of this includes data found on global information networks. With the wealth of information available today, and its value to businesses, managing information effectively has become a priority. However, existing database technologies, including recent advances in database integration, are often constrained when interacting with multiple, voluminous data sources.

As a growing number of companies establish Business-to-Business (B2B) and Business-to-Consumer (B2C) relationships using a global communications network, such as the Internet, traditional data sharing among multiple large data sources has become increasingly problematic. Data required by businesses is often stored in multiple databases, or supplied by third party companies. Additionally, data sharing difficulties are often magnified as companies attempt to integrate internal and external databases. As a result, combining data from separate sources typically creates an expensive and time-consuming systems integration task.

A major problem in data exchange arises from attempting to apply data associated with one structure, to another data structure. Table 1 shows two differing hierarchical data structures. A hierarchical data structure usually contains root, interior and leaf nodes. Each node in the data structures may contain data, or the data may only be contained only in the lowest level nodes, referred to as leaf nodes.

TABLE 1

| Structure A (with data) | Structure B (without data) |
| --- | --- |
| Suspect | Offender |
|   Name |   Identification |
|     First = "John" |     Name |
|     Middle = "Q" |     Address |
|     Last = "Public" |       StreetNum |
|   Address |       StreetName |
|     Street = "123 Main" |       City |
|     City = "AnyTown" |       State |
|     State = "TX" |       ZipCode |
|     Zip = "02334" | |

In order to facilitate the exchange of data, current solutions include standards bodies and consortia that standardize data structure. Standards bodies like RosettaNet, BizTalk, OASIS, and ACORD attempt to standardize data so that it can be exchanged more easily. However, there are problems presented by these solutions. To participate in a consortium, all participants' data has to be modeled in the same manner. Additionally, consortia and standards bodies established to handle similar types of data often have different standards for specific industries. The adoption of standards is also slow, because businesses within each industry still modify data to fit their own company requirements. Hence, given the number of different consortia, standards, and industries, there is still a need for a standard means to exchange data and data structure between different data structures and databases, among companies of the same and different industries, and even among departments of the same companies.

One current approach to filling this need is to painstakingly map one field of data to another, in order to exchange the data with a "non-conformant" entity; that is, one that uses different data structure standards. This process must be repeated not only for every field but also for every different exchange. These solutions to the exchange problem are generally custom "hard-coded" solutions. An efficient, user-configurable method for sharing data between different data structures, by transforming one hierarchical data structure to another, is still lacking.

Technologies such as Structured Query language (SQL), Open Database Connectivity (ODBC) and Extensible Markup Language (XML) have been developed to facilitate data integration. As beneficial as these technologies may be, however, they have failed to address inherent differences in the structure and organization of databases, in addition to the contents. These differences are important, because the richness of the original structure often contributes to the value of its underlying data.

For example, when attempting to store the same type of data or object, such as a customer description, database designers may use different field names, formats, and structures. Fields contained in one database may not be used in another. Or data that is stored in a single field in one database may be stored in several fields in another. If understood and logically integrated, these disparities can provide valuable information, such as how a company gains competitive advantage based on its data structuring. Unfortunately, today's database technologies often cleanse the disparities out of data to make it conform to standards of form and structure. Examples include databases that are converted from one representation to another representation and expressed in XML, using its corresponding hierarchical structure.

Integrating data from multiple environments and formats into a single interoperable structure is particularly necessary to seamless B2B electronic commerce (e-Commerce), and XML enables data to look much more alike than any previous format. However, there are still problems with using XML to represent data. These problems fall into two major categories: 1.) dirty and naturally occurring data perplex XML searching and storage and 2.) data formats or data schemas in the original databases that offer competitive advantage or better reflect the true model of the business and its data, are sacrificed to standards consortia. This means that the database formats or schemas have to be fit into the consortia data standards, which requires a highly skilled technical staff to spend a large amount of time comparing one database schema to another. Moreover, the standards being used and developed to overcome these data exchange barriers sacrifice competitive advantage for interoperability. Today, businesses require both.

Conforming to industry standards may also raise another of other issues, such as intellectual property issues; the ability for data modeled to a specific consortium standard to communicate with other consortia that use a different model or standard; and the handling of legacy data in multiple formats.

SUMMARY

The present invention solves the aforementioned needs, by providing a system and method for data sharing, without requiring that the data be remodeled to fit a common format or convention. Data can be dynamically transformed from any hierarchical structure to any other, regardless of format.

The present invention is a method for sharing data between hierarchical databases, comprising defining, configuring and storing datatypes, defining, configuring and storing hierarchical data structures comprising the datatypes, establishing and storing a lineage for linking related datatypes into families, defining, configuring and storing measures of similarity and similarity match tolerances, defining, configuring and storing match strategies, transforming a source hierarchical data structure to a target hierarchical data structure by determining the similarity between the source and target data structure, and evaluating an effectiveness indicia of match strategies. The method may further comprise manually defining, configuring and storing mappings between datatype elements.

The present invention also provides a user-configurable "tree transformation" system and method that employs a step-by-step process of elimination to take the contents of one hierarchical data structure and apply them to a different structure. It allows for the use of a "dictionary" of common datatypes, which establishes a relationship hierarchy between datatypes so that datatype lineage may be used to facilitate the tree transformation process. The present invention has a user-definable "string similarity" comparator to establish the similarity of two strings, which may be used to facilitate the tree transformation process. It has a user-definable "structure similarity" comparator to establish the similarity of tree structures, which may be used to facilitate the tree transformation process. The present invention also has user-definable element pairing maps, which may be used to facilitate the tree transformation process.

The invention provides a computer-implemented method for applying data from a first hierarchical data structure to a second hierarchical data structure, comprising receiving a source element containing data from the first hierarchical data structure and a target element from the second hierarchical data structure, which is to contain the transformed data. It is determined whether the source element and target element have any child elements. Where the source element has no child elements and the target element has no child elements, the data from the source element is copied to the target element. Where the source element has no child elements and the target element has at least one child element, the data contained by the source element is separated and applied to the at least one target child element. This may be accomplished via a best-fit algorithm, and the source element data may be separated into tokens that are applied to the target child elements.

Where the source element has at least one child element and the target element has no child elements, the data on the at least one child element of the source element is combined into one value and the value is applied to the target element. Where the source element has at least one child element and the target element has at least one child element, it must be determine whether a source child element matches an unfilled target child element. This determination may comprise setting a source child pointer to a first source child element and determining if the first source child element and an unmarked target child element satisfy a first match strategy. Where the first match strategy is satisfied, the target child element is marked and the overall invented method reiterated by receiving the first source child element as the source element and the marked target child element is received as the target element. Where the first strategy is not satisfied, it is determined whether at least one additional source child element exists. Where at least one additional source child element exists, the source child pointer is set to a next source child element and the step of determining whether each child element of the source element matches an unfilled child element of a target element is reiterated.

Where no additional source child elements exist, it is determined whether at least one additional strategy exists. Where at least one additional strategy exists, the step of determining whether each child element of the source element matches an unfilled child element of target element is reiterated, using a next strategy. Where no additional strategies exist, a message is returned, indicating that no match is available between the first source child element and the at least one child of the target element.

Where such a message is returned, the user may explicitly define at least one element match between at least one source element and at least one target element, via a user-definable mapping services facility.

Where a source child element matches an unfilled target child element, the data of the source child element is applied to the unfilled target child element. The steps of the method are reiterated, until all elements of the second hierarchical data structure have been traversed.

Strategies may be used in order of decreasing accuracy and may be stored in and retrieved from a Similarity Score Services facility. A user may define the accuracy of a match strategy. A match strategy comprises at least one comparison utility, each comparison utility chosen from a group consisting of a context comparison utility, an element comparison utility, an attribute comparison utility, a lineage datatype comparison utility, and a tree datatype comparison utility.

The current invention is also directed to a software program embodied on a computer-readable medium, incorporating the invented method.

The current invention is also directed to a computer-based system for applying data from a first hierarchical data structure to a second hierarchical data structure. The system comprises a means for receiving at least one source element from the first hierarchical data structure and at least one target element from the second hierarchical data structure, a means for determining whether source elements and target elements have child elements, a means for copying data from a source element to a target element, a means for separating data from a source element and applying the data to at least one child of a target element, a means for comparing a child of a source element to a child of a target element and determining a match, and a means for copying data from a source child element to a target child element, where a match is determined.

The system may further comprise a means for receiving datatypes from a user and for allowing the user to configure and define the datatypes. The system may further comprise a means for receiving explicit mappings that match at least one source element to at least one target element from a user for allowing the user to configure and define the mappings. The system may further comprise a means for storing at least one match strategy for allowing the user to configure and define the at least one match strategy.

BRIEF DESCRIPTION OF DRAWINGS

These and other features, aspects and advantages of the present invention will become better understood with regard to the following description, appended claims, and accompanying drawings wherein:

FIG. 2 is an example of an embodiment of a typical formal data type specification of the present invention;

FIG. 5A illustrates an example of XML data types for the first example data type family shown in FIG. 4A;

FIG. 5B illustrates an example of XML data types for a more complex data type than that shown in FIG. 5A;

FIG. 6 illustrates sample schemas defined in XML;

FIG. 8A illustrates a formal user defined map specification;

FIG. 8B illustrates a sample of user-defined mappings defined in XML;

FIG. 9A illustrates a formal definition of a Similarity Scoring Service configuration specification;

FIG. 9B illustrates an example XML similarity scoring service configuration;

FIG. 10 illustrates a table of comparison types, their required inputs, and their success indicators;

FIG. 11 illustrates an example of a formal tree transformation engine configuration specification;

FIG. 12 illustrates an example tree transformation engine configuration defined in XML;

DETAILED DESCRIPTION

Please note that within this document, the term hierarchy and tree are used interchangeably but both refer to the same concept. Additionally, please note that every element in a tree can have zero to N (0 . . . N) number of children, and every child in the tree has one parent. The root element of a tree has no parent.

Figure 1:
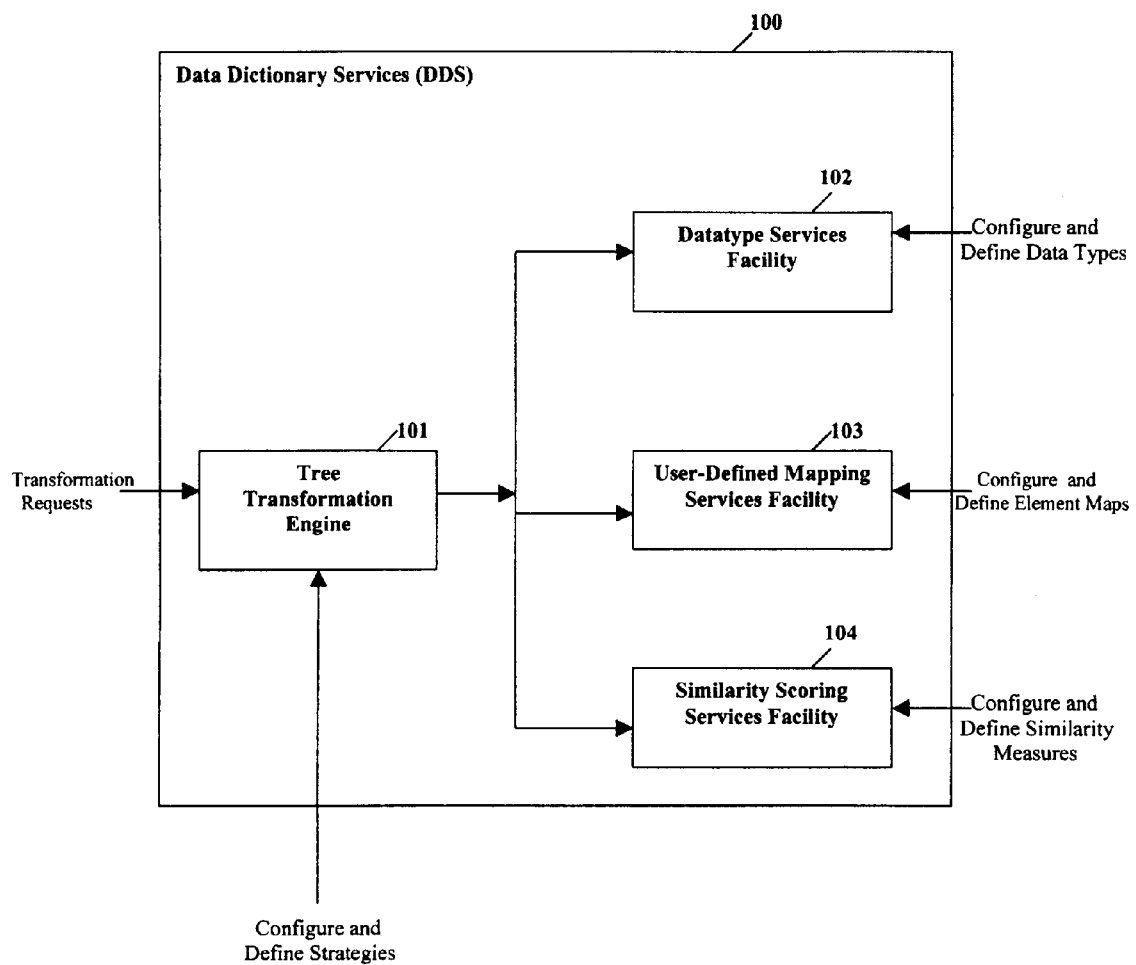
FIG. 1 is an architecture diagram of the present invention.

FIG. 1 illustrates an overview of the architecture of the present invention. A Data Dictionary Service (DDS) 100 acts as a single-point of access, with which users can configure and access the sub-services that provide the functions of the Tree Transformation Engine (TTE) 101. The TTE 101 is a user-configurable facility that employs a step-by-step process to enable accurate transformation of one hierarchical data structure (a "Source tree") to another hierarchical data structure (a "Target tree"). The resultant tree has the structure of the Target tree but is populated with elements from the source tree. The TTE 101 systematically iterates through the data elements of the Source tree and attempts to find a best match pairing with data elements in the Target tree. At each level of the Source tree, the TTE tries a best match strategy first, then successively tries match strategies having diminishing accuracy, until all match strategies are exhausted. The strategies and ordering of importance and accuracy of strategies is user-definable. When a pairing is found that meets the requirements of the match strategy being employed, the pair of Source tree and Target tree data elements are fed back into the TTE 101. The matching process is run recursively until the entire Target tree has been traversed, resulting in a Target tree that contains the data elements comprising data from the Source tree. The TTE 101, as explained below, uses the other services of the DDS 100 to transform data from one hierarchical structure to another.

The Datatype Services facility 102 provides definition and storage of datatypes. Datatypes act as building blocks, with which users may 1) define and configure other datatypes, 2) define and configure hierarchical data structures, and 3) establish lineages that link related datatypes into families. Such a lineage may also be also called an "inheritance model." During the tree transformation process, families of datatypes play a role in determining pairing of data elements.

It may sometimes be unclear how to relate certain datatypes into appropriate families, using the Datatype Services facility 102. During the tree transformation process, then, it may be impossible to determine how some data elements should be paired. The User-Defined Mapping Services facility 103 alleviates this difficulty. The User-Defined Mapping Services facility 103 allows custom configuration of data element maps, so that the pairing of data elements may be explicitly defined, as necessary.

The Similarity Scoring Service 104 allows for the configuration and registration of similarity scoring measures that can compare two objects and return a score based on their similarity. The measures of similarity and any match tolerances to be applied to certain match strategies used by the TTE 101 may be defined and configured by the user.

FIG. 2 illustrates an example embodiment of a typical formal data type specification 200 that may be defined and configured for the Datatype Services facility described with reference to FIG. 1. A datatype is a named entity that describes data structure. A datatype is formally defined in FIG. 2 at 201, as the combination of a Datatype Name 202, a Parent Datatype Reference 203, and an Element 204. The Datatype Name 202 uniquely identifies the datatype and distinguishes it from other datatypes. The Parent Datatype Reference 203 is a reference that indicates that the datatype being defined is a child of the parent datatype being referenced in the Parent Datatype Reference 203.

The Element 204 is a combination of an Element Name 205, a Datatype Reference 206, a Positional Reference 207, an Alias Name 209, and the data Element 204 itself. The Element Name 205 identifies the element and distinguishes it from others. A named datatype 201 can specify its structure by explicitly listing its child elements, by specifying a Datatype Reference 206 that indicates that the element's structure is the same as the referenced datatype, or by a combination of both. Where a Datatype Reference 206 is used, the Datatype Reference 206 references another datatype, using the name of the referenced datatype. The Datatype Reference 206 indicates that the child structure of the named Element 204 is equal to the child structure of the datatype that is referenced by the Datatype Reference 206. A Datatype Reference 206 found on an Element 204 of a datatype indicates that the Element 204 "includes" all of the structure of the referenced datatype. This means that all of the child elements of the parent datatype are implicitly present in the named Datatype 201, without the user having to explicitly specify them.

The Positional Reference 207 may also comprise an Element Reference 208, which is a reference to a child of the datatype specified in the datatype reference of the current element's parent. Finally, the Alias Name 209 is a reference to a child element of the datatype specified in the datatype reference of the current element's parent. The specified value indicates that Element Name 205 replaces the element referred to by the Alias Name 209.

FIGS. 3A–3E are flow diagrams of the processes included in the Datatype Services facility described with reference to FIG. 1. The Datatype Services facility provides a means to manage individual datatypes. It provides the functions to read, write, delete, and locate datatypes as depicted in FIGS. 3A–3E.

Figure 3A:
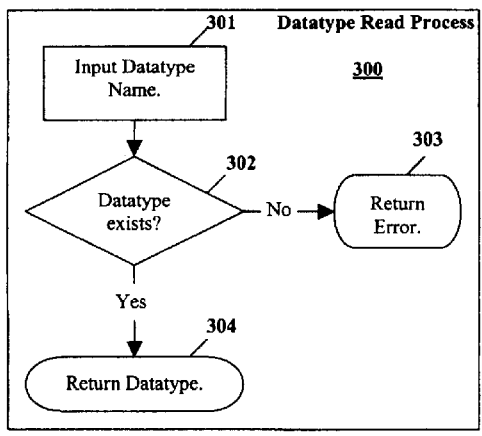
FIG. 3A illustrates the Read Process of the Data Type Services facility.

FIG. 3A illustrates at 300 the Read Process of the Datatype Services facility described with reference to FIG. 1. In accordance with step 301, the name of a datatype that is to be retrieved is input to the Datatype Services facility. In accordance with step 302, it is determined whether the datatype exists. If the datatype does not exist, then an error is returned, in accordance with step 303. If the datatype exists, then the datatype is returned, in accordance with step 304.

Figure 3B:
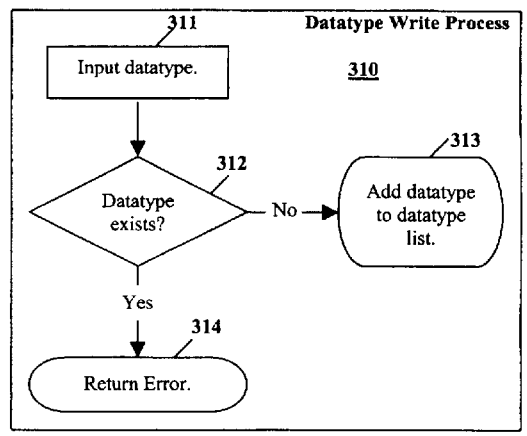
FIG. 3B illustrates the Write Process of the Data Type Services facility.

FIG. 3B illustrates at 310 the Write Process of the Datatype Services facility. In accordance with step 311, the datatype that is to be saved is input to the Datatype Services facility. In accordance with step 312, it is determined whether the datatype already exists in a list of datatypes maintained by the Datatype Services facility. If the datatype does not exist, then the datatype is added to the list, in accordance with step 313. If the datatype already exists, then an error is returned, in accordance with step 314.

Figure 3C:
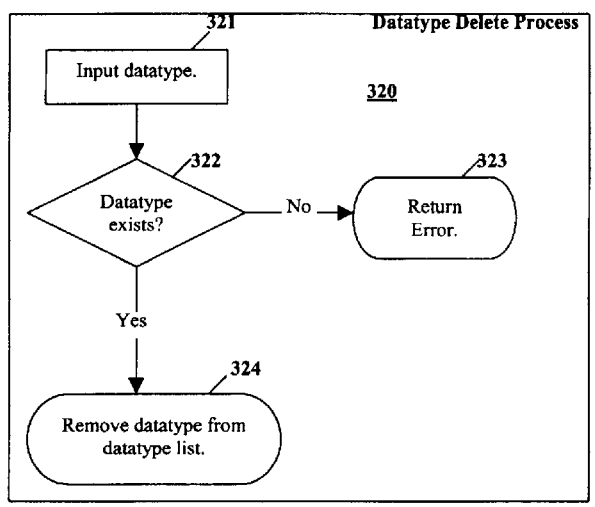
FIG. 3C illustrates the Delete Process of the Data Type Services facility.

FIG. 3C illustrates at 320 the Delete Process of the Datatype Services facility. In accordance with step 321, the name of the datatype that is to be deleted is input to the Datatype Services facility. In accordance with step 322, it is determined whether the datatype exists in a list of datatypes maintained by the Datatype Services facility. If the datatype does not exist on the list, then an error is returned, in accordance with step 323. If the datatype does exist, then the datatype is deleted from the list, in accordance with step 324.

Figure 3D:
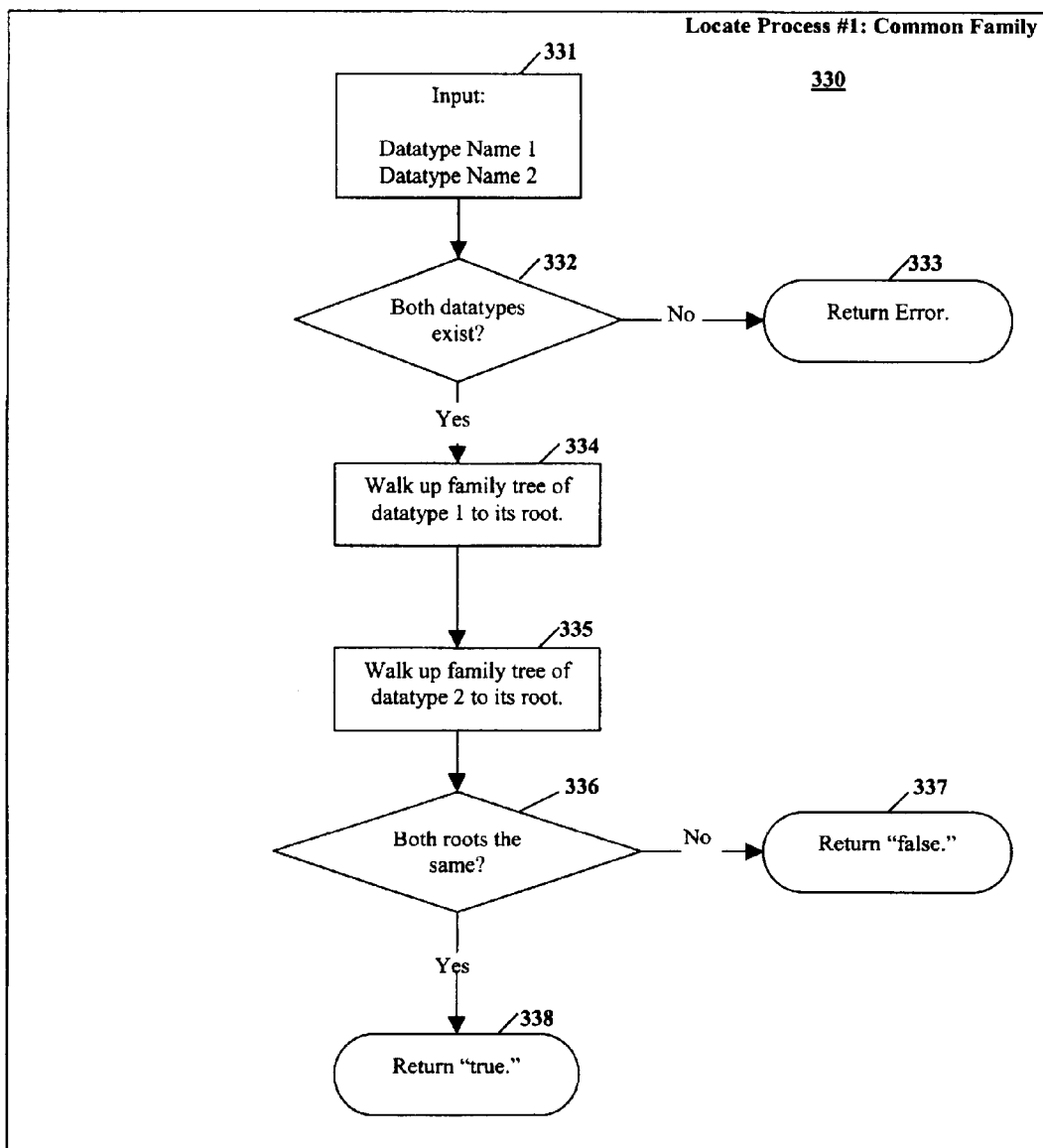
FIG. 3D illustrates a first Locate Process of the Data Type Services facility.

FIG. 3D illustrates at 330 a first locate process of the Datatype Services facility, in which it is determined whether two datatypes are of a common family. In accordance with step 331, names for two datatypes are input. In accordance with step 332, it is then determined whether the datatypes exist. If they do not, then an error is returned, in accordance with step 333. If the datatypes do exist, then the levels of the tree of the first datatype are stepped through in a backwards (upwards) progression, in accordance with step 334, until the root of the first tree is reached. Next, this stepwise procedure is performed for the tree of the second datatype, in accordance with step 335. After the roots of both trees are reached, it is determined whether the roots are the same, in accordance with step 336. If the roots are not the same, a message indicating that the two datatypes are not of same family is returned, in accordance with step 337. One example of such a message is "false." If the roots are the same, a message indicating that the two datatypes are of the same family is returned, in accordance with step 338. One example of such a message is "true."

Figure 3E:
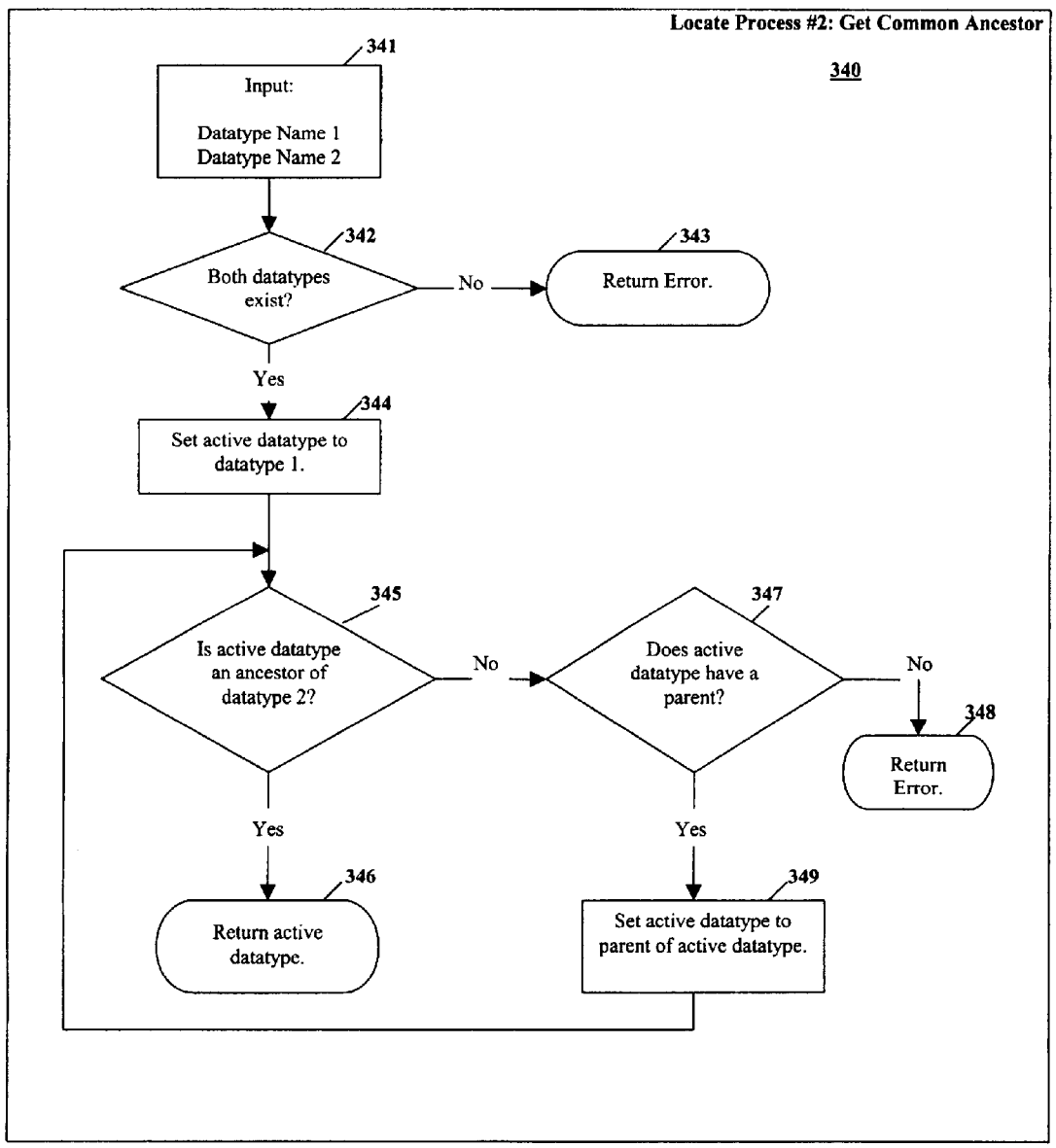
FIG. 3E illustrates a second Locate Process of the Data Type Services facility.

FIG. 3E illustrates at 340 a second location process of the Datatype Services facility, in which it is determined whether two datatypes share a common ancestor. In accordance with step 341, names for two datatypes (represented as data type 1 and data type 2) are input. In accordance with step 342, it is then determined whether the datatypes exist. If they do not, then an error is returned, in accordance with step 343. If the datatypes do exist, then an active datatype setting is set to datatype 1, in accordance with step 344. In accordance with step 345, it is determined whether the active datatype is an ancestor of datatype 2. If the active datatype is an ancestor of datatype 2, then the active datatype is returned, in accordance with step 346. If the active datatype is not an ancestor of datatype 2, such as in the first iteration of the process (where the active data type is set to data type 1) and possibly in others, then it is determined whether the active datatype has a parent, in accordance with step 347. If the active datatype has no parent, then an error is returned, in accordance with step 348. If the active datatype has a parent, then the active datatype setting is set to the parent, in accordance with step 349, and the common ancestor location process continues with an additional iteration of steps 345–349.

Figure 4A:
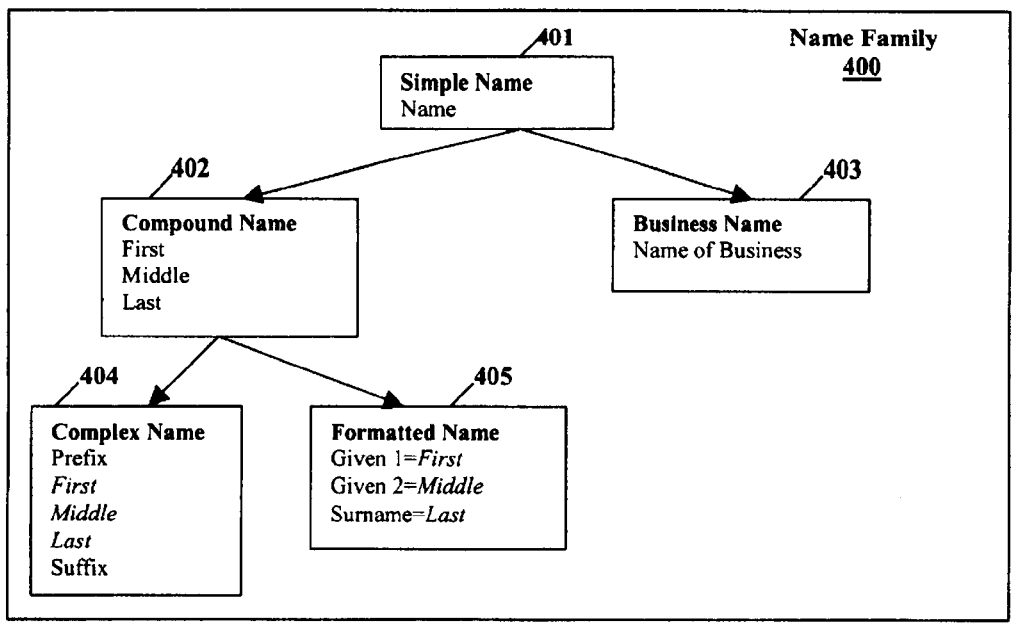
FIG. 4A illustrates a first example of data type families.
Figure 4B:
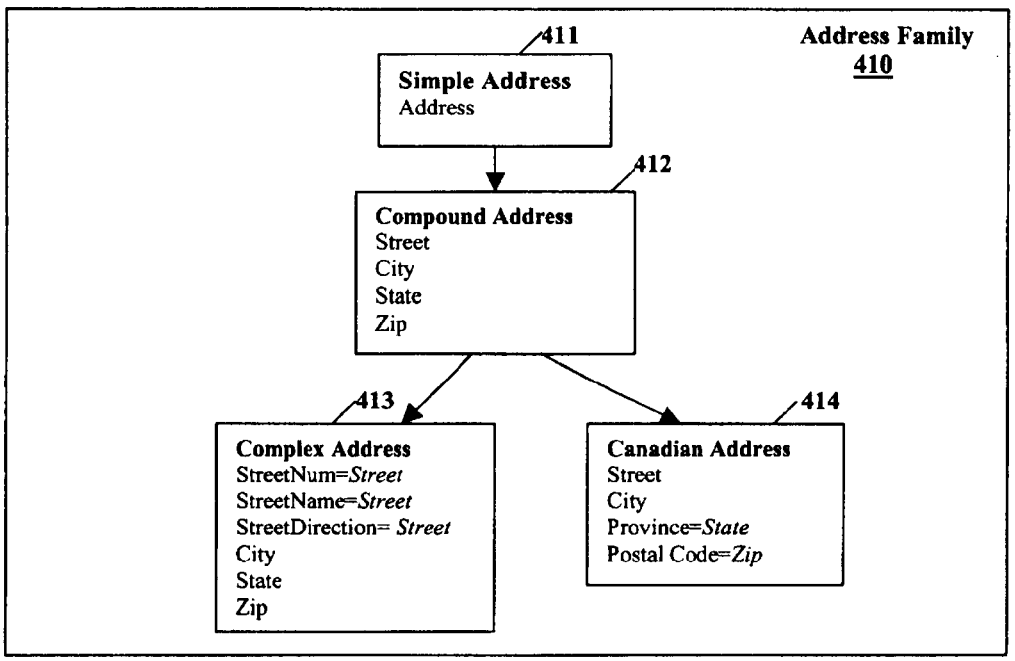
FIG. 4B illustrates a second example of data type families.

FIGS. 4A and 4B illustrate examples of how data may be interrelated to create datatype families. FIG. 4A shows at 400 the interrelation of data to create a Name Family. A Simple Name datatype 401 that identifies an individual or business apart from other objects in a data structure may be related to more specific data. Thus, the Simple Name datatype 401 may have descendants, such as a Compound Name datatype 402, which contains a first, middle, and last name for the individual; or a Business Name datatype 403, which contains only the name of the business. A Compound Name datatype 402 for an individual may be, in turn, a parent to more specific data, such as a Complex Name datatype 404. The Complex Name datatype 404 is made up of Prefix and Suffix explicitly and also contains First, Middle, Last implicitly. This is because the Complex Name datatype 404 is an instance of the Compound Name 402 and "includes" structure 402. Another descendant of the Compound Name datatype 402 may be a Formatted Name datatype 405, which separates the name into given names and surnames.

FIG. 4B shows at 410 the interrelation of data to create an Address Family. A Simple Address datatype 411 that identifies an individual or business address apart from other objects within a data structure may be related to more specific data, such as a Compound Address datatype 412, which contains a street address, city, state, and zip code for the individual or business. The Compound Address datatype 412 may be, in turn, related to more specific data, such as a Complex Address datatype 413, which separates the street address from the Compound Address datatype 412 into a street number, a street name, and a street direction.

If renaming child elements is important, the use of aliases allows derivative datatypes to rename certain child elements. By using the ALIAS_NAME designation, as described with reference to FIG. 2, the "reintroduced" element can change an ELEMENT_NAME, by maintaining an ELEMENT_NAME reference to the child element of the parent data type. This process is evident in FIG. 4B, for example, where the Canadian Address datatype 414 reintroduces "State" and "Zip" as "Province" and "Postal Code". By using the aliases State and Zip, it maintains reference to the old elements in Compound Address datatype 412 and creates an implicit element pair. This facilitates an element pairing process, when transforming one data type structure to another in the same family.

The embodiments shown in FIGS. 4A and 4B are given for illustrative purposes only, and are not intended to limit the scope of the current invention to certain applications. It will be recognized by those skilled in the art that the invention is susceptible of other applications and purposes, without departing from the invention as a whole.

An example of how these relationships may be expressed in a text-based markup language, such as Extensible Markup Language (XML), is illustrated in FIGS. 5A and 5B. XML is used as an example throughout, in order to illustratively explain certain concepts. Representation of a data structure hierarchy in XML is a natural fit because XML is itself a language used to define hierarchies. However, any language suitable for representing the relationships in a data structure may be used, without departing from the scope of the current invention. Other textual markup languages such as SGML and general object-oriented practices of composition may be used, wherein an object can contain other objects, which, in turn contain other objects thereby creating a hierarchy of nested objects.

The textual representation 500 in FIG. 5A, illustrates even further the hierarchical structure of the Name Family described with reference to FIG. 4A, and the inclusion of parent datatypes within their descendant datatypes. If the order of descendants of a datatype is significant, a user can
a) re-specify all of the parent datatype's elements, along with its own, in the proper order. For example in XML:

```
<ComplexName instanceOf="CompoundName">
    <Prefix/>
    <First/>
    <Middle/>
    <Last/>
    <Suffix/>
</ComplexName>
``` b) specify a POSITIONAL_REFERENCE, as described with reference to FIG. 2, that indicates before which element this element is inserted. For example in XML, the POSITIONAL_REFERENCE "First" is added to the element "Prefix", to indicate that the Prefix will be inserted before the First name:

```
<ComplexName instanceOf="CompoundName">
    <Prefix insert="First"/>
    <Suffix/>
</ComplexName>
```

In example a), all elements are re-specified in proper order. In example b), all introduced elements will be appended after existing elements. First, Middle, and Last are already existing prior to their inclusion in the Complex Name datatype. Thus, Suffix doesn't need an insert attribute.

The Data Type Services facility may act as a repository from which users may build complex datatypes that include datatypes from other families, as shown in FIG. 5B at 510. For example, a user may define a new data type called "Person" which introduces a new family. The Person data type may be made, for example, from a Compound Name data type and a Compound Address data type, both from other datatype families, as well as new datatypes, such as a Date data type that represents the person's date of birth, and a SSN data type that represents the person's social security number.

Once a dictionary of data types has been established, the Data Type Service can act as a repository of known data types, from which users can build schemas like those shown in FIG. 6 at 600. A schema is a logical representation of a data hierarchy. In many respects, a schema may be thought of as a higher level version of a single datatype. However, though a data type acts as a building block, and hence defines structure, the data type will not ultimately contain data. A schema, on the other hand, is used to model real-world data.

FIG. 6 shows example schemas that are defined in XML, as illustrations of how schemas may be defined and structured by incorporating and arranging datatypes from various families. For example, Schema A uses Name, Address, and a host of other identifying information to define a data structure for Customer Information about a particular customer. Rather than use all the information of the Name Family shown in FIG. 5A, for example, only the Compound Name and its data elements are used in the hierarchy of Schema A in FIG. 6. However, the Complex Name is used for Schema B. Similarly, only the Compound Address of the Address Family shown in FIG. 4B is used in Schema A for the address portion of the Customer Information. However, the Canadian Address is used in Schema B. Thus, various schemas can be developed using individual data types from various families. Schemas may be defined using other languages and representations than XML, and they may be defined and structured differently than the examples shown in FIG. 6, without departing from the scope of the current invention.

FIGS. 7A–7D show flow diagrams of the User Defined Mapping Services processes, described with reference to FIG. 1. The User Defined Mapping Service (UDMS) facility allows for the storage and retrieval of explicit element pairings. It provides the facilities to read, write, delete, and locate user-defined mappings.

Figure 7A:
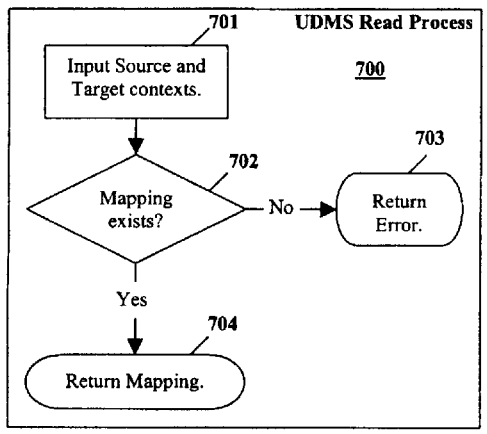
FIG. 7A illustrates the Read Process of the User Defined Mapping Services Facility.

FIG. 7A illustrates at 700 the Read Process of the UDMS facility. In accordance with step 701, the Source schema context and Target schema context of the user defined mapping specification ("mapping") that is to be retrieved are input to the UDMS facility. In accordance with step 702, it is determined whether the mapping specification exists. If the mapping specification does not exist, then an error is returned, in accordance with step 703. If the mapping specification exists, then the mapping is returned, in accordance with step 704.

Figure 7B:
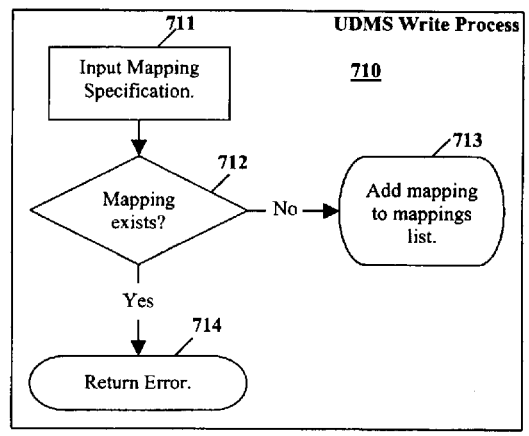
FIG. 7B illustrates the Write Process of the User Defined Mapping Services Facility.

FIG. 7B illustrates at 710 the Write Process of the UDMS facility. In accordance with step 711, the mapping specification that is to be saved is input to the UDMS facility. In accordance with step 712, it is determined whether the mapping specification already exists in a list of mapping specifications maintained by the UDMS facility. If the mapping specification does not exist, then the mapping specification that was input is added to the list, in accordance with step 713. If the mapping specification already exists, then an error is returned, in accordance with step 714.

Figure 7C:
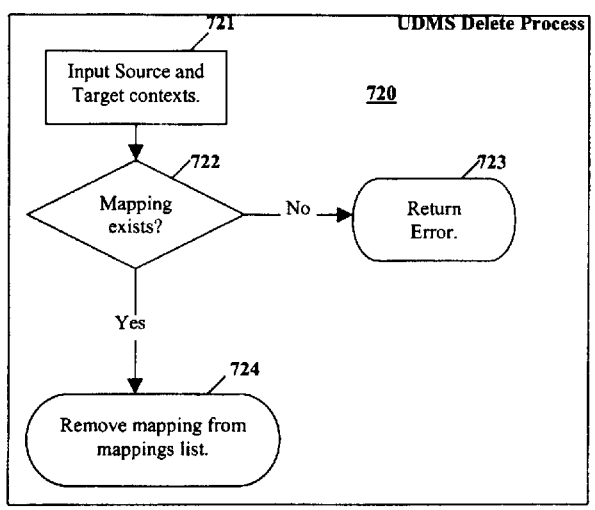
FIG. 7C illustrates the Delete Process of the User Defined Mapping Services Facility.

FIG. 7C illustrates at 720 the Delete Process of the UDMS facility. In accordance with step 721, the Source schema context and Target schema context of the mapping specification that is to be deleted are input to the UDMS facility. In accordance with step 722, it is determined whether the mapping specification exists in a list of mapping specifications maintained by the UDMS facility. If the mapping specification does not exist on the list, then an error is returned, in accordance with step 723. If the mapping specification does exist, then the mapping specification is deleted from the list, in accordance with step 724.

Figure 7D:
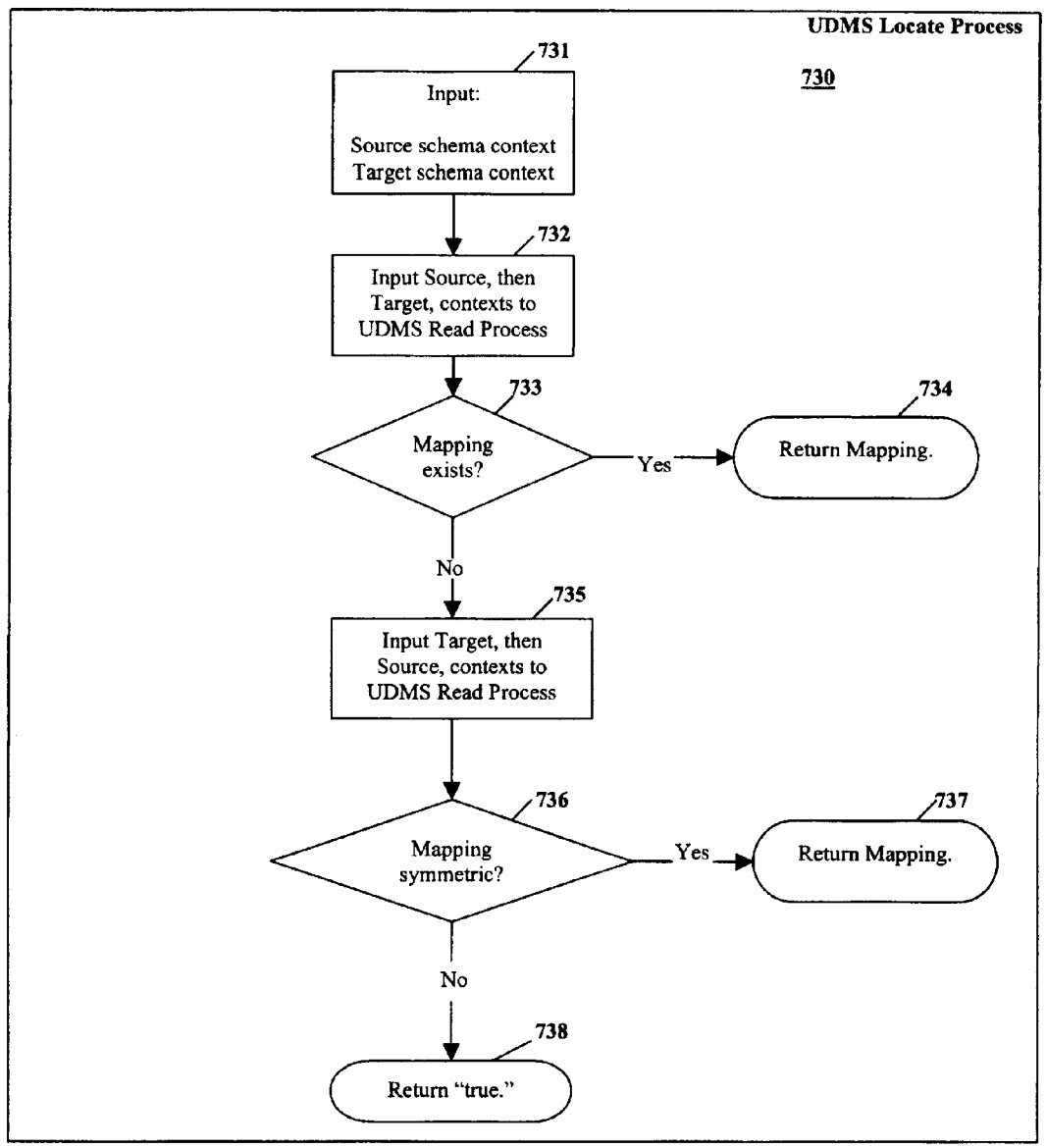
FIG. 7D illustrates the Locate Process of the User Defined Mapping Services Facility.

FIG. 7D illustrates at 730 a Location Process of the UDMS facility. In accordance with step 731, the Source and Target schema contexts for the mapping specification that is to be located are input. In accordance with step 732, the Source schema context is input into the UDMS Read Process described with reference to FIG. 7A. Then the Target schema context is input to the UDMS Read Process. In accordance with step 733, it is then determined whether the mapping specification exists. If it does, then the mapping specification is returned, in accordance with step 734. If it does not exist, then the Target schema context is input into the UDMS Read Process, followed by the Source schema context. Hence, the two are entered in reverse order, in accordance with step 735. In accordance with step 736, it is determined whether the mapping specification is symmetric. If it is symmetric, then the mapping specification is returned, in accordance with step 737. If the mapping specification is not symmetric, then an error is returned, in accordance with step 738.

FIG. 8A shows a formal user defined map specification 800. The map specification 800 contains a definition of a Context Map 801, which includes a Symmetric Designation; a Source element, from which data is to be converted; and a Target element, to which data is to be converted. The Symmetric Designation 802 indicates whether Target to Source mapping is also implied in the context map 801. The Source 803 and Target 804 elements are both defined in terms of their schema contexts. A Schema Context 805 includes a Parent Element Context, a Delimiter, and an Element Name. The Parent Element Context 806 comprises the schema context of the Element's parent. Because each Parent Element schema context also contains a parent element context of its own, the Source and Target elements will be recursively related to all elements in their respective schemas, from which they descend. Thus, full schema contexts can be seen for the Source and Target elements. The Delimiter 807 is a known character value that does not appear in any of the Element Names that make up the schema context for an element. This allows the Source and Target elements to be identified separately from each other, where other schema context aspects may appear the same.

An example of how user-defined context maps may be expressed in XML is illustrated in FIG. 8B which shows an example of user defined mappings defined in XML. Other languages and representations than XML may be used, and user defined context maps may be defined and structured differently than the examples shown in FIG. 8B, without departing from the scope of the current invention. First, the Symmetric Designation is defined as "true" or "false," to indicate whether Target to Source mapping is also implied in the context map. The Source and Target elements are defined, each of which relates to a schema context. In the example shown in FIG. 8B, the Source and Target schema contexts relate to the schemas A and B shown in FIG. 6.

The Similarity Scoring Service (SSS) of the current invention provides users with the ability to register various scoring strategies and comparison algorithms with the service. A comparison algorithm may comprise any suitable algorithm that compares two objects and returns a score based on their similarity. The objects compared may include, but are not limited to, strings, trees, and other more complex objects. Facilities in the SSS provide a means to add, remove, load and execute, and evaluate algorithms contained the SSS. Once registered, the algorithms may be referenced by name.

FIG. 9A illustrates a formal SSS configuration specification 900. A Comparison Algorithm 901 formally includes the Algorithm Name, and Implementation Reference, and Implementation Parameters. The Algorithm Name 902 is a user-defined name that identifies the Comparison Algorithm 901 from other algorithms. The Implementation Reference 903 may comprise any suitable means for identifying a particular implementation for the named Comparison Algorithm 901, apart from other possible implementations of the named Comparison Algorithm 901. Suitable implementation identifications may include, but are not limited to, class names, function call names, and dynamically loadable libraries. The Implementation Parameters 904 are a set of user defined parameters that configure the identified Implementation 903 of the named Comparison Algorithm 901 in the specific instance of use.

FIG. 9B shows a sample of an XML similarity scoring service configuration 910. For example, in FIG. 9B, a Comparison Algorithm having the name NAME_SYNONYM is used. The specific implementation for the algorithm is identified by the character string "com.company.comparisons.SynonymScore". This character string denotes a specific implementation of the NAME_SYNONYM algorithm. The SIMILAR degree is set at 0.9 for instances of the first name (Robert), and set to 0.85 for instances of the second name (John). In this manner, parameters are set for this specific implementation of the NAME_SYNONYM algorithm. Other languages and representations than XML may be used, and SSS configurations may be defined and structured differently than the examples shown in FIG. 9B, without departing from the scope of the current invention.

The TTE described with reference to FIG. 1 provides a facility where the user can enter a source data hierarchy that contains data on its elements, and a target data hierarchy that contains only structure. The user can then expect, as a result, the target structure populated with the data from the source structure. The TTE may be configured by the user to determine the necessary steps, the order of the steps, and the algorithms used, to facilitate the automated transformation of hierarchical data from one structure to another.

The configuration of the TTE can be expressed as a series of strategies. Strategies may be ordered within the TTE by the user in any suitable way. In one embodiment, the strategies are ordered from most accurate to least accurate. The accuracy of a strategy may be measured by the number of successful comparisons, relative to a total number of comparisons performed.

A strategy is a collection of comparisons, which can take the following forms: Context Comparison; Element Comparison; Data Type Comparison; Attribute Comparison.

FIG. 10 illustrates at 1000 the various comparison types, the inputs required for each, and the indicators for evaluating a comparison as successful. The comparison types are not listed in any particular order.

A Context Comparison takes as input a Source schema context and a Target schema context and asks the UDMS, described with reference to FIGS. 7A–7D, if a map exists for these two contexts (including a symmetric version). The existence of a map specification results in a successful comparison.

An Element Comparison takes as input two Element Names, a reference to a Name Comparison Algorithm registered with the SSS, as described with reference to FIGS. 9A–9B, and a normalized threshold score. The comparison evaluates successfully, if calling the Name Comparison Algorithm with the Element Names results in a normalized score greater that or equal to the threshold score.

An Attribute Comparison is similar to an Element Comparison. The Attribute Comparison takes as input two Attribute Values, a reference to an Attribute Comparison Algorithm registered with the SSS, and a normalized threshold score. The comparison evaluates successfully, if calling the Attribute Comparison Algorithm with the Attribute Names results in a normalized score greater that or equal to the threshold score.

A Datatype Comparison can take one of two forms: a Lineage Comparison and a Structure Comparison.

A Data Type Lineage Comparison takes as input two Data Type Names, a reference to a Lineage Comparison Algorithm that is registered with the Similarity Scoring Services, and a normalized threshold score. The comparison evaluates successfully if calling the Lineage Comparison Algorithm with the two Datatype Names results in a score greater than or equal to the threshold.

A Datatype Structure Comparison takes as input two hierarchical data structures, a reference to a Tree Comparison Algorithm that is registered with the Similarity Scoring Services, and a normalized threshold score. The comparison evaluates successfully if calling the Tree Comparison Algorithm with the two hierarchies results in a score greater than or equal to the threshold.

FIG. 11 illustrates a formal specification of a TTE configuration 1100. As explained, the TTE 1101 includes at least one strategy, and each strategy 1102 includes at least one comparison type. Each comparison type 1103 may comprise a Context Comparison, Element Comparison, Attribute Comparison, or Datatype Comparison. A Context Comparison 1104 asks the UDMS if a map exists for two schema contexts (including a symmetric version). An Element Comparison 1105 includes a Name Comparison Algorithm and a normalized threshold score for determining similarity. An Attribute Comparison 1106 includes an Attribute Value, a Name Comparison Algorithm, and a normalized threshold score for determining similarity. A Name Comparison Algorithm 1107 is registered with the SSS. It compares two element names or attribute values and returns a normalized score.

A Datatype Comparison 1108 may comprise either a lineage comparison or a child structure comparison. A Lineage Comparison 1109 includes a Lineage Comparison Algorithm and a threshold score for determining similarity. The Lineage Comparison Algorithm 1110 is a comparison algorithm registered in the Similarity Scoring Services that compares datatypes and returns a normalized score that indicates proximity of the data types are in their family tree. A Child Structure Comparison 1111 includes a Tree Comparison Algorithm and a threshold score for determining similarity. The Tree Comparison Algorithm 1112 is a comparison algorithm registered in the Similarity Scoring Services that compares two data hierarchies and returns a normalized score based on the similarity of their child structures. A threshold 1113, as described with reference to the comparison types, comprises a normalized score that indicates similarity or proximity.

FIG. 12 illustrates an example of how the TTE may be configured using XML. For each strategy of the TTE, a comparison type is specified. For instance, where

```
<STRATEGY>
    <MAP/>
</STRATEGY>
``` is shown, a Context Comparison is identified, referring to the use of the User Defined Mapping Service (UDMS). Alternatively, where

```
<STRATEGY>
    <ELEMENT compare="exact" threshold="1.0"/>
    <DATATYPE compare="lineage" threshold="1.0"/>
    <ATTRIBUTE value="description" compare="exact"
        threshold="1.0"/>
</STRATEGY>
``` is shown, the TTE strategy includes an Element Comparison referred to "exact" as the Name Comparison Algorithm to be used and having a normalized threshold score of 1.0; a Datatype Comparison specifying a Lineage Comparison and having a normalized threshold score of 1.0; and an Attribute Value Comparison, specifying "description" as the attribute, referring to "exact" as the comparison algorithm to be used, and having a normalized threshold score of 1.0. Other languages and representations than XML may be used, and TTE configurations may be defined and structured differently than the examples shown in FIG. 12, without departing from the scope of the current invention.

Figure 13A:
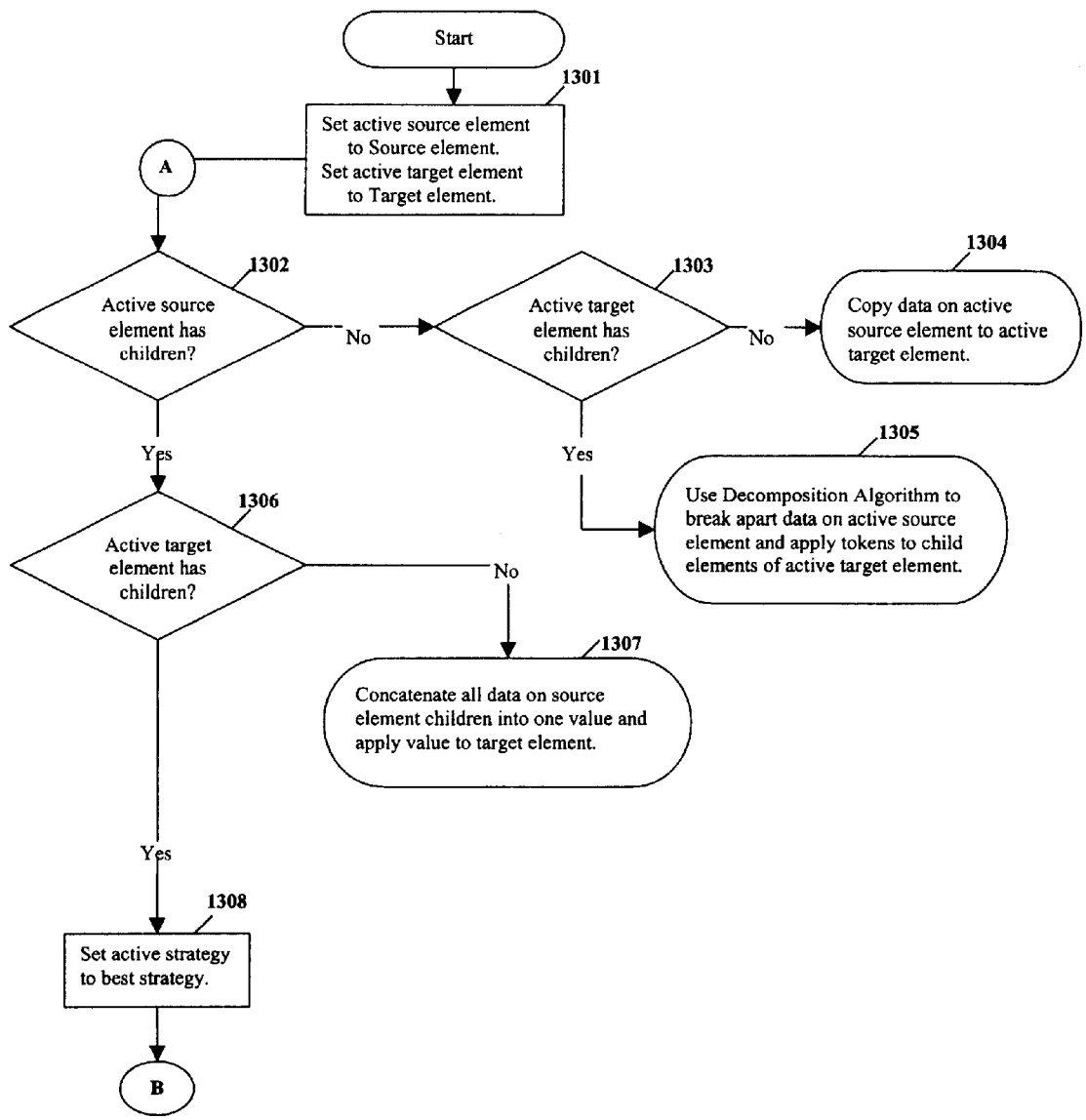
FIG. 13A illustrates a first portion of a flow diagram of a tree transformation Process.
Figure 13B:
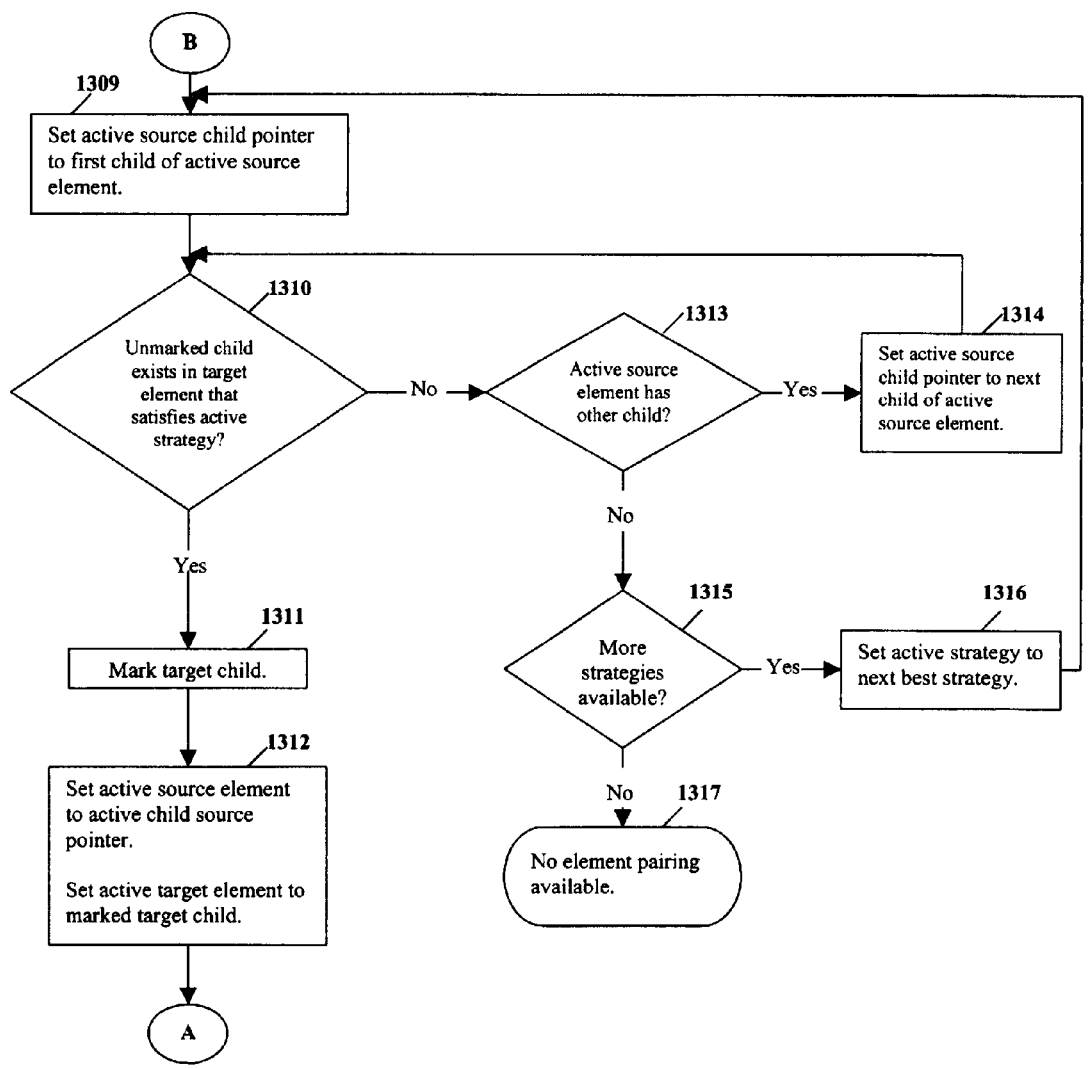
FIG. 13B illustrates a second portion of the flow diagram of FIG. 13A.

A flow chart of the tree transformation can be found in FIGS. 13A–13B. The process starts in FIG. 13A, in accordance with step 1301, by setting the active source element and the active target element. The active source element is set to an element from a Source data hierarchy. The active target element is set to an element from a Target data hierarchy, to which the Source element is to be converted or paired. In accordance with step 1302, it is determined whether the active source element has any children.

If the source element has no children, then it is determined whether the active target element has any children, in accordance with step 1303, and the data contained in the active source element is applied to the target in one of two ways. If neither the active source element, nor the active target element, has children, then the data is applied directly to the target element, in accordance with step 1304. If source element has no children, but the target element does have children, then the data is "tokenized," or broken apart, and distributed among the child elements of the target using a Decomposition Algorithm, in accordance with step 1305. The Decomposition Algorithm 1305 may comprise any algorithm suitable for applying data tokens to child elements of a hierarchical data structure.

If it is determined in step 1302 that the active source element does have children, then it is determined whether the active target element has any children, in accordance with step 1306. If the active source element has children but the active target element does not have children, then the data on the children of the active source element is concatenated into one value and applied to the active target element, in accordance with step 1307. If both the active source element and the active target element have children, then a series of strategies are evaluated on each of the source element children, attempting to find a pair matching for the children of the target. The active strategy is then set to the best strategy, in accordance with step 1308. The best strategy is the first strategy in the strategies of the TTE that have been defined and ordered by the user, as described previously. In one embodiment, the strategies are ordered according to accuracy, and the best strategy comprises the most accurate strategy.

FIG. 13B illustrates the pairing process. The best strategy is evaluated on the first child of the active source element, to find a matching pair with a target element. In accordance with step 1309, an active source child pointer is set to the first child of the active source element. In accordance with step 1310, it is then determined if an unmarked child of the target element satisfies the active strategy.

If an unmarked child of the target element does satisfy the active strategy, then the target child is marked, in accordance with step 1311. In accordance with step 1312, the active source element is then set to the child of the source element to which the pointer is set, and the active target element is set to the marked target child. The Tree Transformation Process is then reiterated, beginning with step 1302.

If no unmarked child of the target element satisfies the active strategy, then it is determined whether there is another child of the active source element, in accordance with step 1313. If so, then the active source child pointer is set to the next child of the source element, in accordance with step 1314, and the pairing process is reiterated, beginning with step 1310. If there are no other children of the source element, then it is determined whether there are other strategies available besides the active strategy, in accordance with step 1315. If so, then the active strategy is reset to the next best strategy, in accordance with step 1316. The active child pointer is then set to the first child of the source element, for use with the new strategy, in accordance with step 1309, and the pairing process is reiterated, beginning at step 1310. If there are no other strategies available, then it is determined that no element pairing is available, in accordance with step 1317, and the pairing process and Tree Transformation Process are terminated.

As shown, the pair matching function is an iterative process that continues, until either all the source children have been matched, or all the strategies have been exhausted.

Figure 14A:
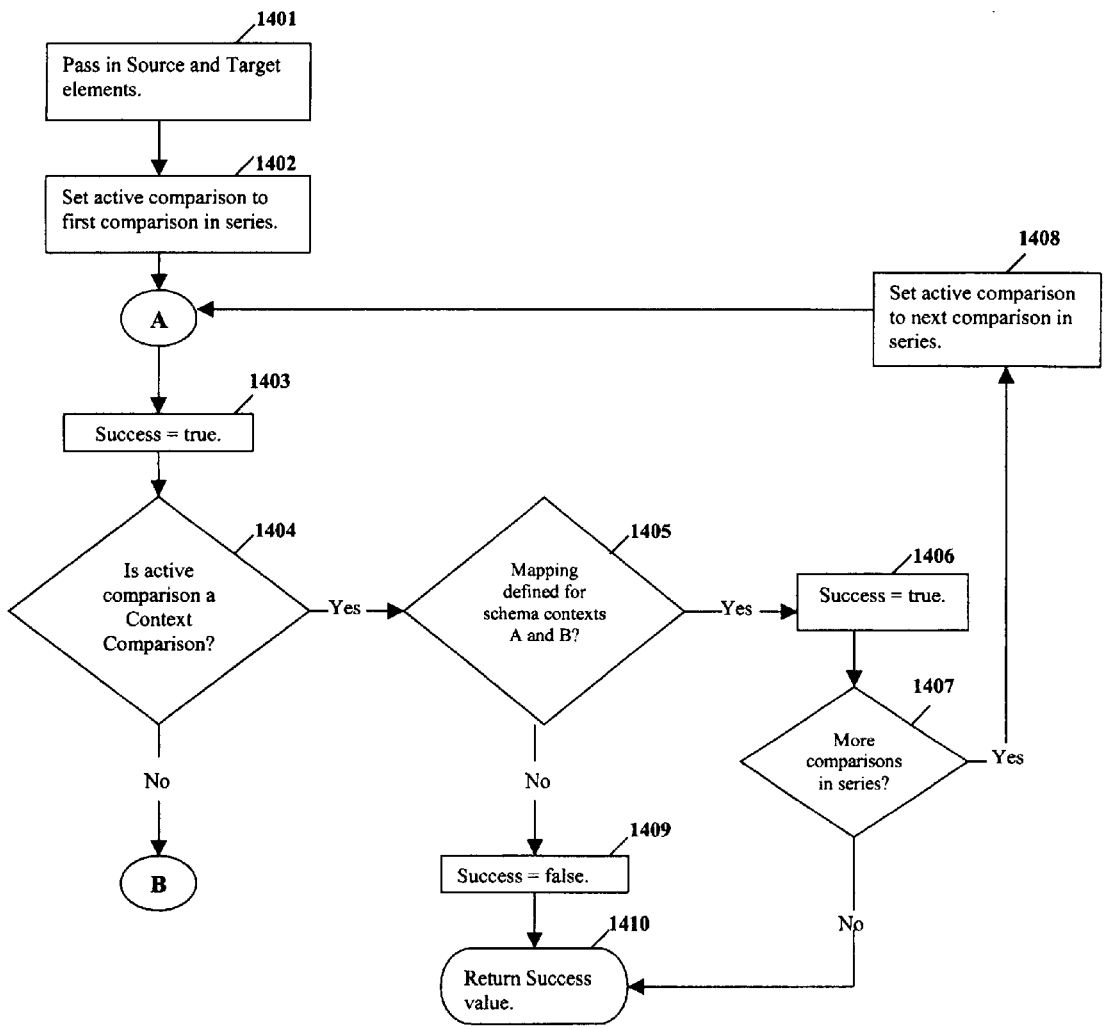
FIG. 14A illustrates a first portion of a flow diagram of strategy evaluation.
Figure 14B:
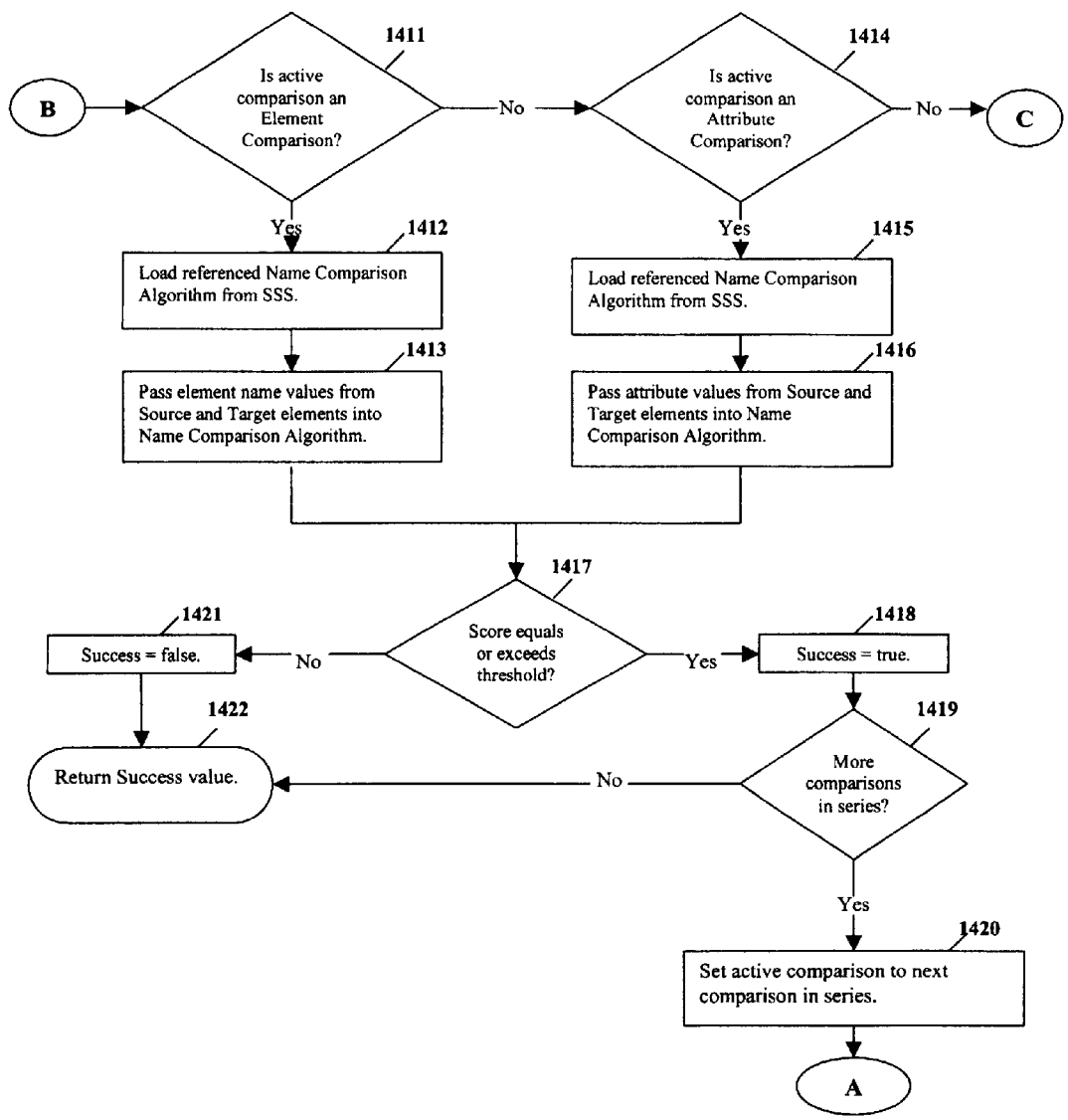
FIG. 14B illustrates a second portion of the flow diagram of FIG. 14A.
Figure 14C:
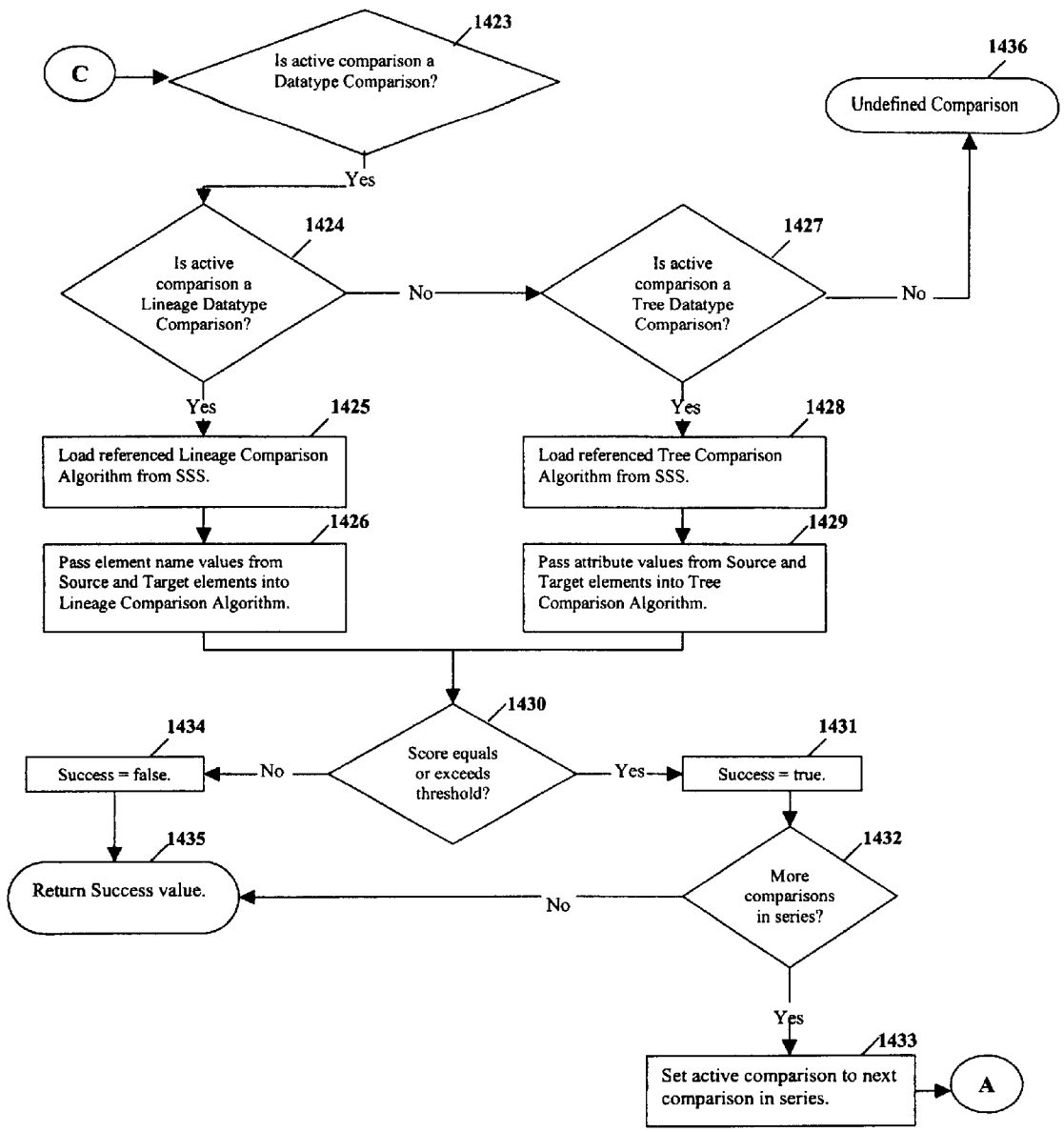
FIG. 14C illustrates a third portion of the flow diagram of FIG. 14A.

FIGS. 14A–14C illustrates how a strategy is evaluated, during the process shown by FIGS. 13A–13B. A strategy evaluation is initiated in FIG. 14 at step 1401, by passing the strategy engine a pair of elements: one from the Source data hierarchy, and one from the Target data hierarchy. As described previously, a strategy is a series of comparisons. Each comparison in the series is evaluated in order. An active comparison is set to the first comparison in the series, in accordance with step 1402. The pair of elements is assumed to satisfy the comparison until a comparator deems then as unsuccessful. Thus, in accordance with step 1403, the Success value is initially set at "true." A determination is then made as to the type of the active comparison. In accordance with step 1404, it is determined whether the active comparison is a Context Comparison. If so, then in accordance with step 1405, it is determined whether a mapping exists for the two elements in the UDMS, as described with reference to FIG. 10. If a mapping exists, then the Success value remains at "true," in accordance with step 1406. In accordance with step 1407, it is then determined whether there are more comparisons in the series of the strategy. If there are more comparisons in the series, then the active comparison is set to the next comparison in the series, in accordance with step 1408, and the strategy evaluation process is reiterated, beginning with step 1403. If no more comparisons exist, then the Success value of "true" is returned, in accordance with step 1410.

If it is determined in step 1405 that a mapping does not exist for the elements, then the Success value for the Context Comparison is set at "false," in accordance with step 1409. The Success value of "false" is then returned, in accordance with step 1410.

If it is determined in step 1404 that the active comparison is not a Context Comparison, then it is determined whether the active comparison is an Element Comparison, in accordance with step 1411. If so, then the Name Comparison Algorithm that is referenced by the Element Comparison, as described at FIG. 10, is loaded from the SSS, in accordance with step 1412. The element name values from the Source and Target elements are then passed into the Name Comparison Algorithm, in accordance with step 1413.

In accordance with step 1417, it is then determined whether the score returned by the Name Comparison Algorithm equals or exceeds the threshold defined by the Element Comparison. If so, then the Success value remains at "true," in accordance with step 1418. In accordance with step 1419, it is then determined whether there are more comparisons in the series of the strategy. If there are more comparisons in the series, then the active comparison is set to the next comparison in the series, in accordance with step 1420, and the strategy evaluation process is reiterated, beginning with step 1403. If no more comparisons exist, then the Success value of "true" is returned, in accordance with step 1422. If it is determined in step 1417 that the score returned by the Name Comparison Algorithm is lower than the threshold score, then the Success value is set to "false," in accordance with step 1421, and is returned in accordance with step 1422.

If it is determined in step 1411 that the active comparison is not an Element Comparison, then it is determined whether the active comparison is an Attribute Comparison, in accordance with step 1414. If so, then the Name Comparison Algorithm that is referenced by the Attribute Comparison, as described at FIG. 10, is loaded from the SSS, in accordance with step 1415. The attribute values from the Source and Target elements are then passed into the Name Comparison Algorithm, in accordance with step 1416.

In accordance with step 1417, it is then determined whether the score returned by the Name Comparison Algorithm equals or exceeds the threshold defined by the Attribute Comparison. If so, then the Success value remains at "true," in accordance with step 1418. In accordance with step 1419, it is then determined whether there are more comparisons in the series of the strategy. If there are more comparisons in the series, then the active comparison is set to the next comparison in the series, in accordance with step 1420, and the strategy evaluation process is reiterated, beginning with step 1403. If no more comparisons exist, then the Success value of "true" is returned, in accordance with step 1422. If it is determined in step 1417 that the score returned by the Name Comparison Algorithm is lower than the threshold score, then the Success value is set to "false," in accordance with step 1421, and is returned in accordance with step 1422.

If it is determined in step 1414 that the active comparison is not an Attribute Comparison, then it is determined in step 1423 whether the active comparison is a Datatype Comparison. If so, then it is determined in step 1424 whether the Datatype Comparison is a Lineage Comparison. If so, then the Lineage Comparison Algorithm that is referenced by the Lineage Comparison, as described at FIG. 10, is loaded from the SSS, in accordance with step 1425. The datatype names from the Source and Target elements are then passed into the Lineage Comparison Algorithm, in accordance with step 1426.

In accordance with step 1430, it is then determined whether the score returned by the Lineage Comparison Algorithm equals or exceeds the threshold defined by the Lineage Comparison. If so, then the Success value remains at "true," in accordance with step 1431. In accordance with step 1432, it is then determined whether there are more comparisons in the series of the strategy. If there are more comparisons in the series, then the active comparison is set to the next comparison in the series, in accordance with step 1433, and the strategy evaluation process is reiterated, beginning with step 1403. If no more comparisons exist, then the Success value of "true" is returned, in accordance with step 1435. If it is determined in step 1430 that the score returned by the Lineage Comparison Algorithm is lower than the threshold score, then the Success value is set to "false," in accordance with step 1434, and is returned in accordance with step 1435.

If it is determined in step 1424 that the Datatype Comparison is not a Lineage Comparison, then it is determined in step 1427 whether the Datatype Comparison is a Tree (or Child Structure) Comparison. If so, then the Tree Comparison Algorithm that is referenced by the Tree Comparison, as described at FIG. 10, is loaded from the SSS, in accordance with step 1428. The tree hierarchies from the Source and Target elements are then passed into the Tree Comparison Algorithm, in accordance with step 1429.

In accordance with step 1430, it is then determined whether the score returned by the Tree Comparison Algorithm equals or exceeds the threshold defined by the Tree Comparison. If so, then the Success value remains at "true," in accordance with step 1431. In accordance with step 1432, it is then determined whether there are more comparisons in the series of the strategy. If there are more comparisons in the series, then the active comparison is set to the next comparison in the series, in accordance with step 1433, and the strategy evaluation process is reiterated, beginning with step 1403. If no more comparisons exist, then the Success value of "true" is returned, in accordance with step 1435. If it is determined in step 1430 that the score returned by the Name Comparison Algorithm is lower than the threshold score, then the Success value is set to "false," in accordance with step 1434, and is returned in accordance with step 1435.

If it is determined that the Datatype Comparison is neither a Lineage nor Tree Comparison, or if it is determined that the active comparison is not a Datatype Comparison at all, then it is determined that the active comparison is undefined, in accordance with step 1436, and the strategy evaluation process is terminated.

FIGS. 14A–14C illustrate one embodiment for evaluating strategies, in accordance with the present invention. It will be recognized by those skilled in the art that changes may be made to the steps shown in the figures, without departing from the scope of the invention. Examples of such changes include, but are not limited to, a change in the order in which the comparison type of the active comparison is determined, and setting the active comparison to the next comparison in the series of a strategy, when it is determined that the active comparison is an undefined comparison.

Using the foregoing, the invention may be implemented using standard programming or engineering techniques including computer programming software, firmware, hardware or any combination or subset thereof. Any such resulting program, having a computer readable program code means, may be embodied or provided within one or more computer readable or usable media, thereby making a computer program product, i.e. an article of manufacture, according to the invention. The computer readable media may be, for instance a fixed (hard) drive, disk, diskette, optical disk, magnetic tape, semiconductor memory such as read-only memory (ROM), or any transmitting/receiving medium such as the Internet or other communication network or link. The article of manufacture containing the computer programming code may be made and/or used by executing the code directly from one medium, by copying the code from one medium to another medium, or by transmitting the code over a network.

An apparatus for making, using or selling the invention may be one or more processing systems including, but not limited to, a central processing unit (CPU), memory, storage devices, communication links, communication devices, server, I/O devices, or any sub-components or individual parts of one or more processing systems, including software, firmware, hardware or any combination or subset thereof, which embody the invention as set forth in the claims.

User input may be received from the keyboard, mouse, pen, voice, touch screen, or any other means by which a human can input data to a computer, including through other programs such as application programs.

Although the present invention has been described in detail with reference to certain preferred embodiments, it should be apparent that modifications and adaptations to those embodiments may occur to persons skilled in the art without departing from the spirit and scope of the present invention.

What is claimed is:

1. A method for sharing data between hierarchical databases, comprising:

defining, configuring and storing datatypes;

defining, configuring and storing hierarchical data structures comprising the datatypes;

establishing and storing a lineage for linking related datatypes into families;

defining, configuring and storing measures of similarity and similarity match tolerances;

defining, configuring and storing match strategies;

transforming a source hierarchical data structure to a target hierarchical data structure by determining the similarity between the source and target data structure; and evaluating an effectiveness indicia of match strategies.

2. The method of claim 1, further comprising manually defining, configuring and storing mappings between datatype elements.

3. The method of claim 1, wherein the step of defining, configuring and storing datatypes comprises reading, writing, and deleting a datatype name, a parent datatype reference, and an element, the element comprising an element name, a datatype reference, a positional reference, an element reference, and an alias name.

4. The method of claim 1, wherein the step of defining, configuring and storing hierarchical data structures comprises specifying a parent datatype reference and an element of a datatype having a datatype reference, an element reference and an alias name.

5. The method of claim 1, wherein the step of defining, configuring and storing hierarchical data structures comprises nesting datatypes into groups of higher level schema datatypes.

6. The method of claim 1, wherein the step of establishing and storing a lineage for linking related datatypes into families comprises locating a common datatype family and locating a common datatype ancestor between a datatype 1 and a datatype 2.

7. The method of claim 6, wherein locating a common datatype family between the datatype 1 and the datatype 2 comprises:
   identifying a root node of a family tree of the datatype 1;
   identifying a root node of a family tree of the datatype 2; and
   determining if the root node of datatype 1 is the same as the root node of datatype 2, for indicating a common datatype family.

8. The method of claim 1, wherein the step of defining, configuring and storing measures of similarity and similarity match tolerances comprises specifying a comparison algorithm by identifying an algorithm name, an implementation, and implementation parameters.

9. The method of claim 1, wherein the step of defining, configuring and storing match strategies comprises specifying comparisons by context, element, data type, and attribute for each of the strategies, and ordering the strategies according to accuracy.

10. The method of claim 1, wherein the step of transforming a source hierarchical data structure to a target hierarchical data structure comprises:
   receiving a source data element from the source hierarchical data structure and a target data element from the target hierarchical data structure;
   determining whether the source data element has at least one source child data element and the target data element has at least one target child data element;
   copying the source data element to the target data element if the source data element has no source child data elements and the target data element has no target child data elements;
   separating the source data element and applying the separated source data element to at least one target child data element if the source data element has no source child data elements and the target data element has at least one target child data element;
   concatenating the at least one source child data element into one value and applying the one value to the target data element if the source data element has at least one source child data element and the target data element has no target child target data elements;
   applying a source child data element to a target child data element when the source child data element matches the target child data element if a source data element has at least one source child data element and a target data element has at least one target child data element; and
   repeating the previous steps until all target data elements have been examined for each of a group of selected strategies.

11. The method of claim 10, wherein the step of separating the source data element further comprises separating the source data elements into tokens and applying the tokens to at least one target child data element.

12. The method of claim 10, wherein the step of separating the source data element further comprises using a best-fit algorithm to separate and apply the data.

13. The method of claim 2, wherein the step of defining, configuring and storing mappings comprises:
   inputting source and target datatypes and retrieving an associated mapping;
   inputting source and target datatypes and removing an associated mapping;
   inputting a mapping specification for storing; and
   inputting source data schema, target data schema, source data, and target data, and retrieve an associated mapping.

14. The method of claim 1, wherein the step of evaluating an effectiveness indicia of match strategies comprises:
   determining a success value of a context comparison between source and target datatypes based on a mapping between source and target schema;
   determining a success value of an element comparison between source and target datatypes based on a name comparison of source and target data elements;
   determining a success value of an attribute comparison between source and target datatypes based on a name comparison of source and target data attributes;
   determining a success value of a datatype comparison between source and target datatypes based on a lineage comparison of source and target datatypes;
   determining a success value of a tree structure comparison between source and target datatype tree structures; and
   aggregating the success values obtained from the comparisons resulting from at least one match strategy to determine an effectiveness indicia for the at least one match strategy.

15. A computer program embodied on a computer-readable medium incorporating the method of claim 1.

16. A system for sharing data between hierarchical databases, comprising:
   a datatype services facility for defining, configuring and storing datatypes and hierarchical data structures, and establishing and storing lineage for linking related datatypes into families;
   a user-defined mapping services facility for defining, configuring and storing mappings between data elements;
   a similarity scoring services facility for defining, configuring and storing measures of similarity and similarity match tolerances; and
   a tree transformation engine for defining, configuring and storing match strategies, transforming a source hierarchical data structure to a target hierarchical data structure by determining the similarity between the source and target data structure, and evaluating an effectiveness indicia of match strategies.

17. The system of claim 16, further comprising at least one match strategy from the tree transformation engine that is stored in the similarity scoring services facility.

18. The system of claim 16, further comprising at least one match strategy from the similarity services scoring facility that is provided to the tree transformation engine.

19. The system of claim 16, wherein each of the match strategies comprise at least one comparison utility selected from the group consisting of a context comparison utility, an element comparison utility, an attribute comparison utility, a datatype lineage comparison utility, and a datatype tree structure comparison utility.

20. The system of claim 16, wherein the match strategies are stored in the similarity scoring services facility in descending order by the effectiveness indicia of each match strategy.

21. The system of claim 20, wherein the effectiveness indicia is a match strategy accuracy.

22. The system of claim 16, wherein a user may explicitly define a match between datatype elements using the user-defined mapping services facility.

* * * * *